United States Patent
Tanevski et al.

(10) Patent No.: US 9,420,483 B2
(45) Date of Patent: Aug. 16, 2016

(54) METHOD OF REAL-TIME REGULATION COMPLIANCE FOR WIRELESS TRANSMITTERS

(71) Applicant: Ecole Polytechnique Federale de Lausanne (EPFL), Lausanne (CH)

(72) Inventors: Mitko Tanevski, Neuchâtel (CH); Alexis Boegli, Gampelen (CH); Pierre-Andre Farine, Neuchâtel (CH)

(73) Assignee: Ecole Polytechnique Federale De Lausanne (EPFL) (CH)

( * ) Notice: Subject to any disclaimer, the term of this patent is extended or adjusted under 35 U.S.C. 154(b) by 21 days.

(21) Appl. No.: 14/402,986

(22) PCT Filed: May 23, 2013

(86) PCT No.: PCT/EP2013/060630
§ 371 (c)(1),
(2) Date: Nov. 21, 2014

(87) PCT Pub. No.: WO2013/174928
PCT Pub. Date: Nov. 28, 2013

(65) Prior Publication Data
US 2015/0156652 A1     Jun. 4, 2015

(30) Foreign Application Priority Data
May 25, 2012   (EP) .................................. 12169671

(51) Int. Cl.
*H04W 24/08* (2009.01)
*H04W 74/00* (2009.01)
*H04W 84/18* (2009.01)

(52) U.S. Cl.
CPC .............. *H04W 24/08* (2013.01); *H04W 74/00* (2013.01); *H04W 84/18* (2013.01)

(58) Field of Classification Search
CPC ..... H04W 24/02; H04W 24/08; H04W 24/10; H04W 74/00; H04W 84/18; H04W 4/005
See application file for complete search history.

(56) References Cited

U.S. PATENT DOCUMENTS 7,830,918 B2 * 11/2010 Das ........................ H04L 49/90
370/465
8,670,360 B2 * 3/2014 Barthel ................ H04B 7/2656
370/310

(Continued)

FOREIGN PATENT DOCUMENTS

WO    WO-2011015960 A1    2/2011

OTHER PUBLICATIONS

ETSI, Electromagnetic Compatibility and Radio Spectrum Matters (ERM); Short Range Devices (SRD); Radio Equipment to be use in the 25 MHz to 1 0000 MHz Frequency Range with Power Levels Ranging up to 500 mW; Part 1: Technical Characteristics and Test Methods, 2010, pp. 1-73.

(Continued)

*Primary Examiner* — Ahmed Elallam
(74) *Attorney, Agent, or Firm* — Blank Rome LLP

(57) ABSTRACT

All wireless devices must comply with the local radio regulations which are set by international and national regulatory bodies such as the European Telecommunication Standardization Institute (ETSI) for Europe and the Federal Commission for Communication (FCC) for US. A new firmware module is proposed, that will ensure that devices, in all circumstances will comply with the ETSI regulations for single channel emissions in the 868 MHz ISM band. Namely, assuring compliance with the duty-cycle limit, the maximum TX time and minimum TX-off time limit. Such a solution has not been researched mostly due to the popularity of the virtually worldwide 2.4 GHz ISM band which does not have duty-cycle limitations. The wireless sensor networks (WSN) operating in the 868 MHz band have their own niche applications that benefit from the increased signal range. The development and the acceptance of such applications will benefit from the existence of the proposed module implemented in firmware/software. We propose such a solution and demonstrate its implementation on a custom developed node and protocol. Implementation on top of standardized protocol layers is also analyzed. We also analyze the memory, time and energy overheads caused by including the module in the firmware.

6 Claims, 2 Drawing Sheets

(56) References Cited

U.S. PATENT DOCUMENTS

| | | | |
|---|---|---|---|
| 2006/0067245 A1 | 3/2006 | Pearl | |
| 2007/0038776 A1 | 2/2007 | Abhishek et al. | |
| 2011/0124363 A1 | 5/2011 | Calvarese et al. | |
| 2013/0016667 A1 | 1/2013 | Blomqvist et al. | |
| 2013/0237777 A1* | 9/2013 | Patel | A61B 5/0024 600/301 |

OTHER PUBLICATIONS

Heile, et al., IEEE Standard for Technology, Part 15:4: Wireless Medium Access Control (MAC) and Physical Layer (PHY) Specifications for Low-Rate Wireless Personal Area Networks (WPANs), 2006, pp. 1-305.

Heile, et al., IEEE Standards Association, Part 15:4: Low-Rate Wireless Personal Area Networks (LR-WPANs), Amendment 3: Physical Layer (PHY) Specifications for Low-Data-Rate, Wireless, Smart Metering Utility Networks, 2012, pp. 1-236.

Tanevski, et al., Firmware for Ensuring Realtime Radio Regulations Compliance in WSN, Local Computer Networks Workshops, IEEE 37th Conference, 2012, pp. 917-920.

Tanevski, et al., Robust Ultra Low Power Wireless Sensor Platform With Embedded Over-Molded Antenna, Electronics and Signal Processing Laboratory Ecole Polytechnique, 2011, pp. 1-6.

International Search Report issued in PCT/EP2013/060630 on Nov. 14, 2013.

Tanevski et al., "RoSe: A Subgigahertz Wireless Sensor Platform with Housing-Integrated Overmolded Antenna," IEEE Transaction on Instrumentation and Measurement, vol. 16, No. 11, Nov. 2012, pp. 2982-2992.

\* cited by examiner

METHOD OF REAL-TIME REGULATION COMPLIANCE FOR WIRELESS TRANSMITTERS

REFERENCE DATA

This application is a U.S. national phase of International Patent Application No. PCT/EP2013/060630, filed May 23, 2013, which claims priority of European patent application EP12169671.0 of May 25, 2012. The entire contents of those applications are hereby incorporated by reference.

FIELD OF THE INVENTION

The present invention relates, in embodiments, with radio transmitters compliant with radio emission standard and, in particular, with transceivers suitable for use in wireless sensor nodes in Wireless Sensor Networks (WSNs).

DESCRIPTION OF RELATED ART

A typical WSN deployment scenario: battery powered wireless sensor nodes, and possibly other mains-powered nodes with function of relay and/or gateway that provide a level of network infrastructure. Typically, wireless transmission among these nodes occur in an ISM or in a license-free band, like for example the 433 MHz ISM band, the 868 MHz ISM band, the 2'450 MHz ISM band, or other suitable portion of the spectrum. WSN systems are typically used to make periodical measurements or transmit event-based reports in monitoring applications.

At present, wireless sensor networks operating in the 868 MHz band and not employing Adaptive Frequency Agility (AFA) must comply with the ETSI regulations for single-channel emission, namely they must assure compliance with certain duty-cycle, maximum TX time and minimum TX-off time limits as specified in the applicable norms. Such limitations are not applicable to the 2'450 MHz ISM band but, on the other hand, operation in the 868 MHz band does provide some advantage in terms of range and energy consumption. It is foreseen that future norms on new available bands may also limit other parameters such as the time structure of the transmitted energy, as it is done at present in the 868 MHz band.

According to the regulation existing in the band used, the nodes intervening in a WSN system may be subject to limitation in the emitted power, and/or the duty cycle, i.e. the fraction of time during which they are allowed to transmit. When WSN applications operate at high duty-cycle and low bit-rate, such that transmission durations of the sensor nodes are close to the maximum allowed limit, the nodes risk breaking the duty cycle limit when frame repetitions become necessary. Relay nodes, on the other hand, need to forward all frames to and from the nodes which connect through them, and have a high risk to reach the maximum allowed duty-cycle. The gateway node may be affected by the duty cycle limits for WSN applications in which the synchronizations with the nodes are more frequent, or when acknowledgements of received frames are requested.

Furthermore, even when devices operate normally with a duty cycle below the limit, transmission durations can peak above the limits when a network disturbance or measurement retrieval occurs. These occurrences depend not only on the WSN design but also on its operational history. Indeed, with the development of complex WSN protocols and applications it becomes increasingly difficult if not impossible to predict all states and circumstances in the operation.

A sensor node in WSN system, such as for example a food cold chain monitoring application could become disconnected from the WSN but still keep making measurements and logging them locally. Once the connection to the WSN is restored, the node would send the logged data to the gateway and, in this kind of situations, would spend significantly more time transmitting and risk to hit the duty-cycle limit. The situation becomes worse as the network becomes crowded because each such disturbance would generate additional interference, additional frame repetitions and additional measurement retrievals.

Several systems are known that deal with regulatory emission limits in wireless sensor networks; among them US2007038776 describes a method of ensuring regulatory compliance for wireless devices; US2013016667 proposes to limit a transmission bandwidth according to transmission rules, and WO2011015960 describes devices that can be configured according to different compliance modes. These systems, however, do not provide a satisfactory solution for managing the duty cycle of the transmitters according to regulatory limits, without excessively penalizing transfer rates or general performance.

US2006067245 discloses a duty cycle management system and method for use in a wireless device having a transmitter which transmits packets in the form of individual packets and/or packet bursts. A controller in combination with an instruction set limits the number of packets transmitted during each time period defined by one time window or adjacent time windows, on a sliding basis, so as to control the duty cycle of transmissions during successive adjacent time windows based on the transmitter's output power, to produce that average power output. The transmission of packets is thereby delayed as needed to establish sufficient idle period(s) during one time window or adjacent time windows to apply whatever duty cycle is needed to produce that average power output level limit for the transmitter.

Publication "Firmware for ensuring realtime radio regulations compliance in WSN" discloses a firmware module that will ensure that devices, in all circumstances, will comply with the ETSI regulations for single channel emissions in the 868 MHz ISM band. Namely, assuring compliance with the duty-cycle limit, the maximum Tx time and minimum Tx-off time limit.

US2011124363 discloses a programmable controller and software that monitors periods an RF transmitter is active and a output power level during those periods of activity. These two values are multiplied together and accumulated over time to provide a value for the RF emissions for some period. A limit is set for the RF emissions for any period and if the RF emissions exceeds (or is expected to exceed given the current rate) the set limit, the system limits the subsequent emissions to not exceed the set limit.

BRIEF SUMMARY OF THE INVENTION

The present invention proposes WNS nodes that are able to dynamically manage the compliance of their transmission pattern with regulatory limits, and adapt their transmission behavior autonomously. This is achieved by the method that is the object of claim 1, and by wireless transmitters that are arranged to carry out such method.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
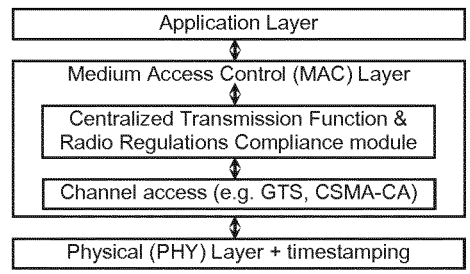
FIG. 1 represents schematically the structure of a WSN communication protocol stack suitable for the realization of the invention

An important aspect of the present invention is that wireless nodes are equipped with radio regulation compliance (RRC) module, for example a firmware module that checks each transmission attempt for consistency with a predefined radio regulations standard. The RRC module checks for compliance several parameters of the transmitted radio signal as a function of the time, including notably the duty cycle, but also the total 'on' time etc.

This implies that all transmissions need pass this "compliance test layer" before being passed to lower protocol layers and transmitted by the radio device of the wireless sensor. By setting an adequate interface this new firmware entity can be placed immediately below the application layer requiring the application to be aware of its existence and understand its return codes. Frames that should be transmitted are passed to the radio regulations compliance (RRC) module that in its turn decides whether sending the frame will still comply with the rules or not. Having a RRC module provides several advantages:

1) Firmware-wise it ensures that the wireless sensor node will comply with the regulations as long as its hardware is compatible.
2) Enables application development without the need of in-depth knowledge of the regulations, provided that the module has been previously written to comply with the specific regulations.
3) Avoids breaking the regulation compliance in abnormal situations such as retrieving measurements from a sensor node that has been disconnected for a certain period.
4) Provides a safeguard for event driven applications where transmission is triggered by an event external to the node.
5) Enables operation to the limits of the maximal duty cycles at the same time guaranteeing compliance with the regulations.

The invention can be applied to transceivers that use conventional narrow-band modulation and also to Frequency Hopping Spread Spectrum or other modulations that benefit from unrestricted transmission duty cycle but have other restrictions regarding the transmission durations, TX-off times etc.

When developing communication protocols for sub-GHz wireless sensor networks several parameters need to be considered concurrently. Several of those parameters come directly from the radio regulations.

TABLE I extract of the ETSI regulation for the 868 MHz ISM band

| Frequency | Maximum radiated power e.r.p | Duty Cycle |
| --- | --- | --- |
| 863.00-870.00 MHz | 25 mW (≈14 dBm) | 0.1% |
| 864.80-865.00 MHz | 10 mW (10 dBm) | No restriction |
| 868.00-868.60 MHz | 25 mW (≈14 dBm) | 1% |
| 869.40-869.65 MHz | 500 mW (≈27 dBm) | 10% |
| 869.70-870.00 MHz | 25 mW (≈14 dBm) | 1% |
| 869.70-870.00 MHz | 5 mW (≈7 dBm) | No restriction |

Table I summarizes the radiated power and duty cycle limitation specified by "ETSI EN 300 220-1 V2.3.1" European Standard (Telecommunications series), pp. 1-73, 2010. for the 868 band specified for a period of 1 hour. Maximum continuous transmission is limited to 1 s and minimum TX-off time is >100 ms. The compliance with the ETSI regulations for single channel WSN in this band requires that power, duty cycle and transmission duration be verified. These parameters depend in a complex way from the bit-rate, the channel coding and the WSN/MAC protocol. MAC protocol layers for WSN such as 'WiseMAC' for example, use variable preamble length or frame repetition in order to improve the energy efficiency. This effectively means that it becomes more difficult for the node to be aware of how much time it has spent transmitting. Moreover, several different protocol concepts exist and have been proposed in literature suggesting that no one single solution could meet the needs for all applications.

Figure 2:
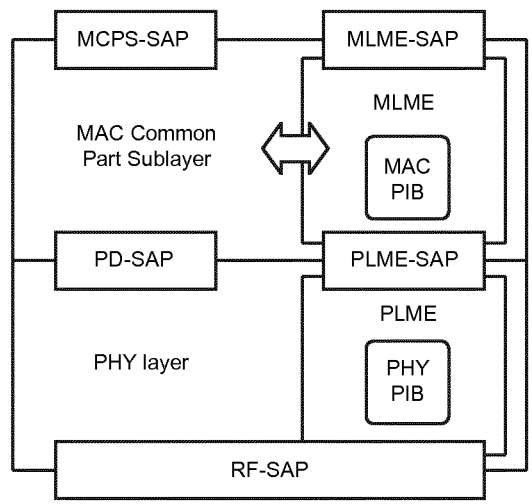
FIG. 2 represents schematically the standardized structure of MAC and PHY protocol stack's layers according to IEEE 802.15.4

As example, FIGS. 1 and 2 illustrate the structure of a WSN communication protocol stack suitable for the realization of the invention and according to IEEE 802.15.4 This structure effectively hides the detail of the physical RF transmission form the higher-level layers but, makes it difficult to implement a duty-cycle management in the application layer, for example.

Figure 4:
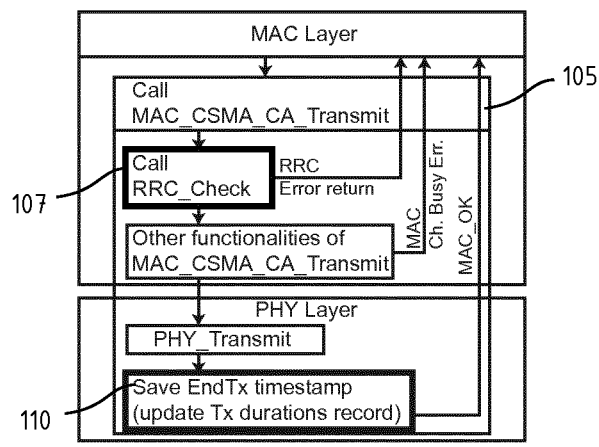
FIG. 4 shows a possible implementation of the method of the invention in the MAC layer

The present invention proposes a solution to this difficulty by implementing a real-time radio regulations compliance module that is placed directly below the application layer but at the same time being aware of the physical and MAC layer parameters. FIG. 4 shows a WSN communication protocol stack including the RRC module of the invention. The figure implies that there is information exchange/sharing between the radio regulations compliance module and all other layers, namely the application layer, MAC layer and the physical layer.

Preferably a mechanism should be provided that will permit the RRC module to obtain all parameters it needs to correctly perform its task. The needed parameters are usually spread in the MAC and Physical layer. The MAC layer contains all parameters that are needed to calculate the total MAC layer frame length based on the application layer frame length. Similarly, the Physical layer contains all parameters that are needed to calculate the Physical layer frame length based on the MAC layer frame length. In addition to this, in order to obtain the total transmission time, the channel coding and the bit-rate also need to be taken into consideration.

The IEEE 802.15.4-2006 standard ("IEEE Standard for Information Technology—Telecommunications and Information Exchange Between Systems—Local and Metropolitan Area Networks—Specific Requirements Part 15.4: Wireless Medium Access Control (MAC) and Physical Layer (PHY) Specifications for Low-Rate Wireless Personal Area Networks (WPANs)," IEEE Std 802.15.4-2006 (Revision of IEEE Std 802.15.4-2003), pp. 0 1-305, 2006) specifies the Physical (PHY) and MAC layer for low-rate wireless personal area networks (LR-WPAN). The standard specifies PHY layers in the 868 MHz band which are meant to operate under ETSI approval standards. The physical layer of the standard specifies two attributes that can be used in the purpose of obtaining the duration of the PHY frame, namely the phySHRDuration attribute which specifies the duration of the synchronization header (SHR) in symbols and the phySymbolsPerOctet attribute which specifies the number of symbols per octet for the PHY. The physical layer also adds a single physical layer header octet which has the same format for all defined PHY specifications in the standard.

The MAC layer, however, as defined in the standard, does not have single attribute or primitive that will allow immediate evaluation of the MAC layer frame size (based on the application layer frame size) which is passed on to the PHY layer for further encapsulation. This is mainly due to the fact that the MAC layer can also by itself generate frames for transmission. A possible implementation would be to use the value of the frame size that is passed from the MAC to the PHY layer by using the PD-DATA.request primitive. However in cases where the application makes frequent attempts for transmissions that would not comply with the radio regulation rules, this method becomes inefficient. This is because the MAC layer implements the CSMA-CA with clear channel assessment (CCA) and channel back-off mechanisms that delay the actual transmission of the frame to the PHY layer. If the frame compliance with the regulations is performed at the interface between the MAC and PHY layers then the frame could be rejected for transmission after the MAC layer already performed the CCA and the random back-off (according to CSMA-CA). Hence, those tasks will represent pure energy loss when the frame is rejected. At this point we have to note that according to the ETSI standard a device which complies with the e.r.p. limits and maximum transmission duty-cycle does not have to perform clear channel assessment nor random back-off. Good engineering practice, however, is to use mechanisms such as CSMA-CA because they reduce collisions and improve overall communication energy efficiency. This leads us to the conclusion that for an efficient implementation of RRC module in protocols compliant with the standard, the MAC layer must be modified to include services that will evaluate the frame size before performing any other operation.

However, modifying a MAC layer implementation based on the standard can be performed without changing the standard. An application layer for example that is aware of the additional functionality of the MAC layer, can choose to use the functionality or ignore it and fall back to using only the standard functionality. Such an implementation can be carried out by implementing function/primitive wrappers for the two MAC sublayer Service Access Points (SAPs) the MAC Common Part Sublayer (MCPS) SAP and the MAC Layer Management Entity (MLME) SAP as shown in FIG. 2. The application layer would communicate only with the radio regulations compliance module using the same primitive formats as if would be talking to the MAC layer except that it will be passing the primitives to the RRC module. The RRC module would verify if primitives that cause RF transmissions are in compliance with the regulations, and if not, it will return a corresponding error code to the application layer.

Proprietary WSN protocols implement the physical and medium access layers in a different way aiming at various improvements such as longer battery life, higher throughput, improved resistance against interference etc. We will discuss the implementation of radio regulations compliance module on the proprietary protocol developed for the "round sensor" node described in the contributions by M. Tanevski, A. Boegli, P. A. Farine, F. Merli, J. F. Zurcher, and A. Skrivervik, "Robust ultra low power wireless sensor platform with embedded over-molded antenna," in Sensors Applications Symposium (SAS), 2011 IEEE and M. Tanevski, F. Merli, A. Boegli, J. F. Zürcher, A. Skrivervik and P.-A. Farine "RoSe: A Subgigahertz Wireless Sensor Platform with Housing-Integrated Overmolded Antenna" IEEE Transactions on Instrumentation and Measurement 2012, vol. 61, pp. 2982-2992. doi:10.1109/TIM.2012.2202184 IEEE that are hereby incorporated by reference. First, the WSN protocol and some of the limitations will be briefly presented in order to see where the RRC layer will be of most use. Example frame lengths are defined according to the experience with the commercialized food cold chain monitoring application and demo temperature monitoring application.

The frame lengths as stated in Table II include the PHY preamble i.e. they include all the bytes sent through the radio. The protocol is implemented using several frame types as shown in Table II.

TABLE II

Transmission durations for different frames

| Frame type | Length [bytes] | [ms] @25 kbps |
| --- | --- | --- |
| confirm | 17 | 5.44 |
| Beacon | 19 | 6.08 |
| Sync | 21 | 6.72 |
| Data request | 24 | 7.68 |
| Device Announce | 26 | 8.32 |
| Measurement | 26 | 8.32 |
| Device Set | 32 | 10.24 |
| Maximal frame | 128 | 40.96 |

The network functionality can be summarized as follows:
Network beacon frame is broadcast from the gateway node and forwarded by all relay nodes
Device Announce frame is used by the node to announce itself to a WSN coordinator and initiate network attachment.
Device Set frame is used by the network coordinator in order to configure the node and complete the network attachment.
Measurement data frame is sent from each sensor node and it can be of different length depending on number of measurements it contains (normally not acknowledged).
Synchronization frame is sent from the gateway to the node. This frame enables periodical check of connectivity between the gateway and the node.
Confirm frame is used by the node to confirm correct reception of frames from the coordinator.
Data request frame is used by the WSN coordinator for measurement retrieval for a defined period.
Data reply frame is used by the node to reply to data request frame i.e. to send older measurements to the WSN coordinator.
Sensor nodes sense the channel with duty-cycle of 10 ms. Other devices repeat the frames in a burst of duration greater than the channel sensing duty-cycle (10 ms) such that at least one full frame is outside the interval which ensures that reception is possible For the maximal allowed duty-cycle of 0.1% the transmission time per hour is 3.6 seconds per device. In our example, network attachment is performed by a pair of Device Set—Confirm frame and synchronization is performed by a pair of Synchronization—Confirm frame. Depending on the frequency of those tasks and the measurement frames, as shown in Table IV-B, the relay node can serve a limited number of nodes keeping its TX duty-cycle less than 0.1%.

TABLE III

Number of nodes a relay node can serve

| Conditions: (bitrate 25 kbps) | N |
|---|---|
| 1 WSN attach.; 60 NW beacon; 1 sync/hour; 1 meas/minute | 4 |
| 1 WSN attach.; 6 NW beacon; 1 sync/hour; 1 meas/minute | 6 |
| 1 WSN attach.; 60 NW beacon; 1 sync/6 hours; 1 meas/minute | 4 |
| 1 WSN attach.; 60 NW beacon; 1 sync/hour; 1 meas/10 minutes | 32 |

Figure 3:
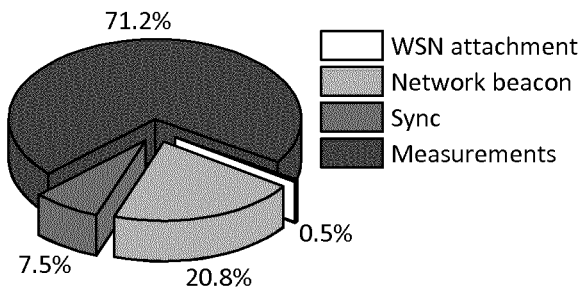
FIG. 3 illustrates graphically the amount of transmission time devoted to measurement transmission and protocol-related actions in a WSN network.

Table III shows the number of nodes that can be served by a relay node under various show conditions and limited by the emission regulations. It is apparent that these figures are rather limiting. The tasks repartition for the conditions of the first row in Table III, as shown in FIG. 3, shows that still more than 70% of the TX time is used for the primary functionality—forwarding measurements.

Preferably, the method of the invention implements the RRC module in the MAC layer and expands the MAC layer return codes with additional error codes. In this way the application layer needs only to implement handling of the new error codes. In our protocol implementation, all transmissions are performed by calling a specific function called MAC_CSMA_CA_Transmit (105 in FIG. 4). This function uses 3 parameters: the frame size the data and the number of times the frame should be repeated in accordance with the frame bursting. Preferably, the RRC check is executed upon entry in this function. The RRC module needs to maintain the accumulated TX duration for the last hour from the current time and the time stamp of the end of the last transmission. The first one of these two tasks is more complicated and resource hungry than it would seem on the first sight, mostly because of the limited memory resources available on the microcontrollers that are commonly used in wireless sensor nodes. The device must keep a log of all transmissions during the last hour by saving the duration and the timestamp of the transmission-end (or start) for each transmission. If a measurement frame of 8.32 ms is used to fill the 3.6 s maximum TX limit, then the node would have to save 432 timestamps and durations. When high bitrates and transmission duty cycles are used, the memory demand will also become high. For this reason we propose minute averaging which limits the size of needed memory to 60 timestamps and durations. Moreover, the timestamps don't need to be saved if a circular buffer is used that holds the cumulative transmissions for each minute in the last hour. The timestamp storing module is indicated by block 110 in FIG. 4.

In other words, the history of transmission during the interval prescribed by the norms (one hour in the case of the present example) is stored in a buffer that has a plurality of positions or bins, each of them stored the transmission time occurred in a predetermined fraction (one minute in this case) of the one-hour interval.

According to a possible implementation, The RRC module is implemented as a single function 107 which is called upon entry in the function MAC_CSMA_CA_Transmit. The RRC function called MAC_RRC_Check takes 2 parameters: the length of the frame and number of times it should be repeated. Additionally the already exiting parameters from the PHY layer which give the sum of bytes in the PHY header and the data-rate given in bytes-per-second are accessible to the function. These parameters are included in the interface file of the PHY layer implemented in C. FIG. 4 shows the function call tree inside the MAC layer with the elements 107 and 110 inserted for radio regulations compliance indicated by a double border. This architecture has the advantage of being almost transparent for the application layer that must simply deal with a new error code, and ensures that the emission limits are respected no matter what.

TABLE IV

RRC algorithm
RRC_Check Algorithm

| | |
|---|---|
| 1 | Calculate the total time of the requested TX in ms and round up. |
| 2 | If the total single TX time is greater than the max. allowed (1 second in the case) return RRC_MAX_TXDUR_ERR. |
| 3 | Get the current time in seconds and milliseconds. |
| 4 | If the time passed since the last transmission is less than MIN_TXOFF (100 ms in the case) return RRC_MIN_TXOFF_ERR. |
| 5 | Get the number of minutes that have passed since the last transmission. |
| 6 | If less than an hour has passed since the last TX put zeros in the TX duration circular buffer for each minute passed. |
| 7 | Sum the total TX time for the last hour. |
| 8 | 1. If adding current TX duration to the sum exceeds the limit return RRC_MAX_DCLIM_ERR. |
| | 3. Transmit and add the TX duration to the current minute (may be the same minute as the last TX). |
| | 5. If more than an hour has passed, set the |
| 10 | durations buffer to all zeros and execute point 9. |

A consequence of using minute averaging is that the hourly duty cycle limits will be updated only when a full minute has elapsed because no information is provided for the time within the minute at which the transmission occurred. RRC will keep returning error codes in cases where already few seconds in the new minute more than 1 hour has elapsed since the TX in the "oldest minute" in the buffer. However, this represents less than 1.7% reduction of the transmission limit in case of uniformly spread transmissions over time. If needed, and the resources permitting, the granularity of the circular buffer can be increased, for example to 180 averaging bins of 20 seconds each to cover one full hour, or to any other suitable combination.

One of the constraints in wireless sensor devices is the size of the firmware footprint. The described RRC functionality was implemented on the proprietary node used in the tests above, which has ATmega644PV microcontroller with 64 kB flash program memory and 4 kB RAM. The code was written with priorities set to code size and efficiency. WinAVR-20100110 C compiler was used having optimization set to Os i.e. code size optimization. The code was build including the RRC functionality which showed that the program memory overhead was 612 bytes and data memory overhead was 126 bytes as compared to a build which doesn't include RRC functionality. This overhead considers only the implementation of the RRC functionality in the MAC layer (gray boxes in FIG. 4 and doesn't include the processing of the return codes in the application layer. All data memory is statically allocated. The circular buffer has the main impact on the statically allocated RAM usage as it occupies 120 bytes with the 60 2-byte integers each containing the transmission duration for the respective minute in milliseconds. The remaining six bytes are for the end of transmission time stamp (five bytes) and one byte for the current index of the circular buffer. If the duty cycle limit for the band is 0.1% then the proposed solution is suboptimal and saving the cumulative number of bytes would provide more accurate calculations for bitrates up to around 145 kbps. Up to this bit-rate the node could still use the whole permitted transmission time of 3.6 s within one minute and two bytes would suffice for saving the cumulative number of transmitted bytes.

Two methods can be used to ensure optimal use of memory and accurate calculations. First method is to adjust the format of the circular buffer to meet the transmission needs of the underlying WSN application providing at the same time high accuracy. For applications that transmit with low-duty cycle such as for example two to six times per hour under normal conditions, higher averaging times can be used to achieve good trade-off between number of records and precision. This can be implemented by using pre-prepared versions of the RRC functionality that are chosen at compile- or run-time by setting the parameters of maximum allowed transmission duty cycle, application messaging duty-cycle and bit-rate.

Besides the error codes, the RRC module 107 could also update a diagnostic journal dependent on the result of its checks.

Importantly, even if the present example is limited to the management of the duty cycle and total TX time, the method of the invention can also be applied to the management of other parameters required for emission compliance. The RRC module 107 could, for example consider, in addition or in alternative to duty cycle, TX time, and TX off times, also a maximum radiated power and/or a radiated power spectral density, channel access method, modulation, frequency of transmission, signal bandwidth, based on data available in the Physical layer, and generate appropriate error codes when predetermined limits are exceeded.

According to a variant, the invention could use dynamically allocated memory for the circular buffer and the timestamps. The advantage of this method is that the function can be set to provide the best use of the memory by performing runtime tradeoffs between number of points and accuracy. This method however might not be justifiable for the wireless sensor nodes that have limited memory resources and would otherwise not use memory management routines. Indeed, adding the standard library malloc routine in our code (which otherwise does not use it) to allocate the circular buffer causes the RRC module program memory overhead to rise to 1182 bytes. The data memory overhead is 18 bytes not including the actual circular buffer which is allocated at runtime. Furthermore, each memory allocation is associated with pointer generation and additional overhead because of the memory management functionality.

Figure 5:
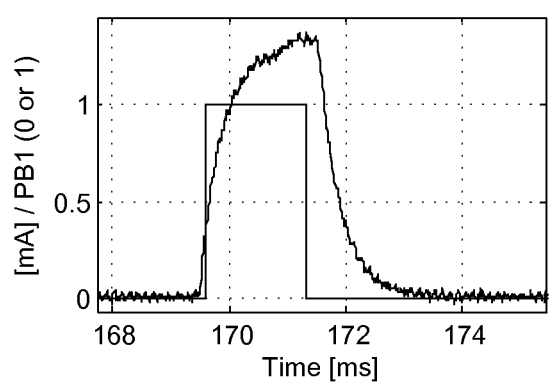
FIG. 5 illustrates the energy demand of the method of the invention executed on ATmega644 PV MCU with a clock of 1.8432 MHz and 3V supply voltage.

Energy-wise, or charge-wise the addition of the RRC routines represents insignificant overhead compared to transmission. To quantify that overhead, the supply current was sampled at 125 kS/s while the node was performing the RRC check functionality and the recording of the timestamp at the end of the transmission. FIG. 5 shows the supply current waveform for the sensor node having 3 V supply voltage and 1.8432 MHz operating frequency.

An external pin (PB1 of the Microcontroller) was toggled to high during the execution of the RRC code and is plotted on FIG. 5 for reference. Toggling a single pin requires only one instruction (0.6·s) hence the time the pin remains high accurately represents the time needed for the RRC check. The transmission functionality of the sensor node was disabled in order to obtain net effect of the RRC functionality. The consumed charge was in the order of 0.54 to 0.75 nAh i.e. three orders of magnitude lower than the charge needed for transmission which is in order of 1·Ah. The most demanding task from the RRC algorithm is to sum the total TX time for the last hour and in cases of the other two errors both the time and the consumed charge overhead will be lower. The error reports returned by RRC module to the application layer can be saved along with other diagnostic parameters and used during development of WSN protocols.

The invention claimed is:

1. A method of real-time regulation compliance for a wireless transmitter, comprising:
   receiving a transmission request;
   calculating a transmission time duration of the transmission request;
   storing the calculated transmission time duration of the transmission request into a circular buffer having positions, wherein each position in the circular buffer covers a predetermined fraction of a determined time interval;
   update a total transmission time of all the transmissions occurred within the determined time interval, by adding together all transmission time durations which are stored in all the positions of the circular buffer;
   compute an elapsed time since the last previous transmission;
   check the compliance of said transmission time, total transmission time and elapsed time against predetermined criteria;
   dependent on the result of said check, execute the transmission request or generate an error code.

2. The method of claim 1, further including:
   estimate a maximum radiated power and/or a radiated power spectral density;
   check the compliance of said maximum radiated power and/or a radiated power spectra/density against predetermined criteria.

3. The method of claim 1 further including checking the compliance of one or more of the following: channel access method, signal modulation, frequency of transmission and signal bandwidth against predetermined criteria.

4. The method of claim 1, comprising a step of updating a diagnostic journal dependent on the result of said check.

5. The method of claim 1, including storing elapsed transmission times in the circular buffer.

6. A system comprising a microcontroller and a memory, the microcontroller configured to carry out the method of claim 1.

* * * * *